United States Patent [19]

Scott

[11] Patent Number: 5,045,672

[45] Date of Patent: Sep. 3, 1991

[54] CHAFING DISH AND METHOD OF USING SAME

[76] Inventor: Chester B. Scott, 35 Broadwalk Villas, Lexington, S.C. 29072

[21] Appl. No.: 595,187

[22] Filed: Oct. 10, 1990

Related U.S. Application Data

[63] Continuation-in-part of Ser. No. 438,777, Nov. 17, 1989, abandoned.

[51] Int. Cl.$^5$ ............................................. H05B 3/78
[52] U.S. Cl. ..................................... 219/439; 126/33; 219/430; 219/432; 219/437
[58] Field of Search ................ 219/439, 430, 432, 436, 219/437; 126/33

[56] References Cited

U.S. PATENT DOCUMENTS

| | | | |
|---|---|---|---|
| 887,923 | 5/1908 | Crandall | 219/437 |
| 1,689,915 | 10/1928 | Endorf | 219/523 |
| 1,693,522 | 11/1928 | Medearis | 219/430 |
| 1,697,732 | 1/1929 | Newland | 219/319 |
| 1,843,455 | 2/1932 | McGowen | 219/523 |
| 1,961,756 | 6/1934 | French | 219/430 |
| 2,448,634 | 9/1948 | Smith | 219/316 |
| 2,471,259 | 5/1949 | Chapman | 219/441 |
| 2,481,384 | 9/1949 | Blackwell | 219/316 |
| 2,576,688 | 11/1951 | Landgraf | 219/318 |
| 3,476,915 | 11/1969 | Rapsis | 219/523 |
| 3,489,880 | 1/1970 | Bloomfield | 219/436 |
| 3,673,386 | 6/1972 | Drugmand et al. | 219/523 |
| 3,973,102 | 8/1976 | Macklem | 219/523 |
| 4,365,143 | 12/1982 | Kerber | 219/439 |
| 4,658,117 | 4/1987 | Sayward, Jr. | 219/437 |

FOREIGN PATENT DOCUMENTS

| | | | |
|---|---|---|---|
| 708160 | 7/1941 | Fed. Rep. of Germany | 219/437 |
| 499613 | 11/1954 | Italy | 219/438 |
| 642290 | 8/1950 | United Kingdom | 219/437 |

*Primary Examiner*—Telsa J. Walberg
*Attorney, Agent, or Firm*—Watts, Hoffmann, Fisher & Heinke Co.

[57] ABSTRACT

A chafing dish has a constantly energized, lift out immersion heater. The heater has a heat loop configured to permit concurrent use of flame from cans of fuel without the flame damaging the heater. The heat loop is positioned in a water pan. Cool arms project upwardly through notches in a food pan and lid in one embodiment and the water pan in another embodiment. In a method of operating a chafing dish predetermined amounts of water are supplied and the water is caused to function as a thermostat.

22 Claims, 3 Drawing Sheets

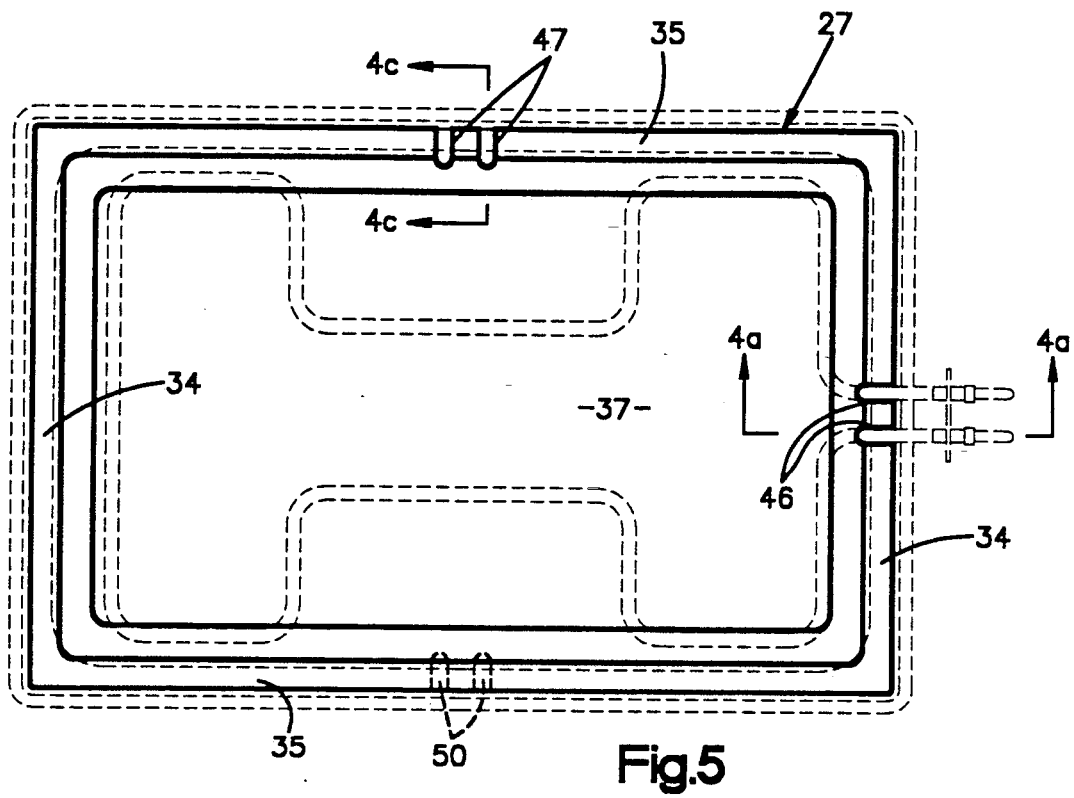
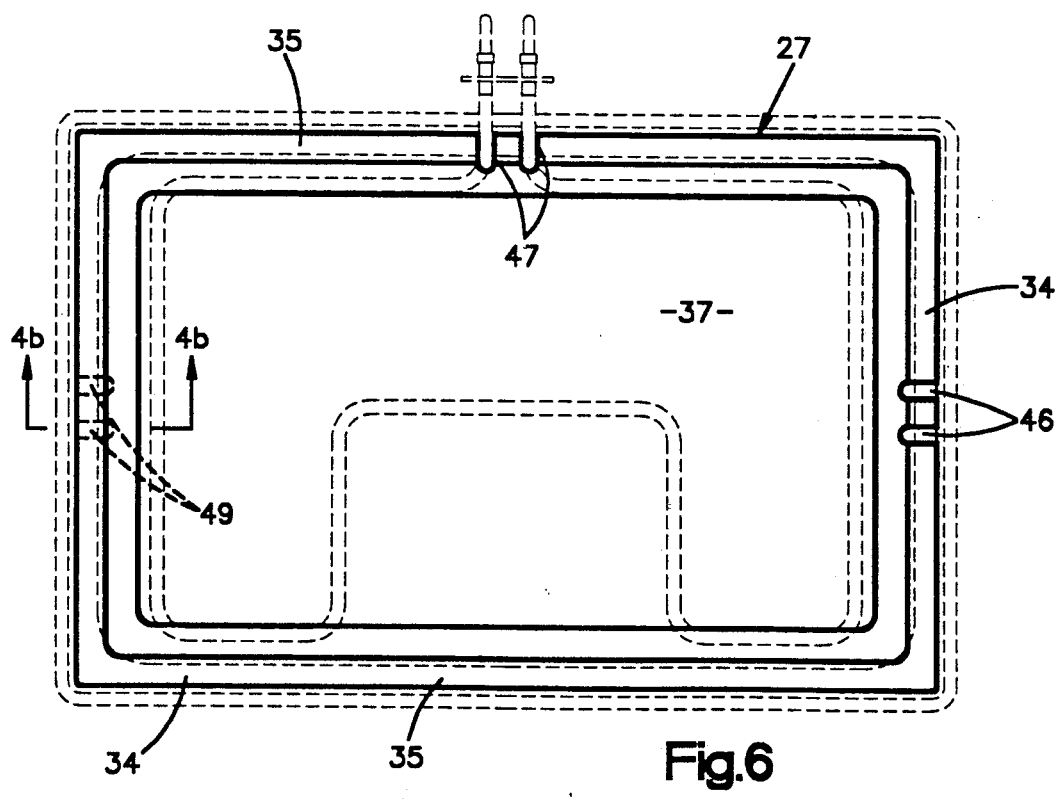

CHAFING DISH AND METHOD OF USING SAME

This is a continuation-in-part of application Ser. No. 07/438,777 filed Nov. 17, 1989, now abandoned.

This invention relates to chafing dishes and more specifically to a novel and improved electrically heated chafing dish and a method of operating a chafing dish including determining a volume of water appropriate to produce a desired water vapor condition to maintain a specific food at a temperature appropriate for its serving.

BACKGROUND OF THE INVENTION

Chafing dishes are widely used for buffet type food service, serving hors d'oeuvres, and other purposes. Such chafing dishes typically include a water pan supported by a leg and a bracing structure. A heat source is used to heat the water in the water pan. A food pan is supported by the water pan above the level of the water. A lid is provided to cover the food pan.

In most instances flames from canned fuels are used as the heat source. Other chafing dishes have been proposed which use electrical heaters rather than flames to heat the water.

Whether the heat source is electrical or flame the intent is to generate hot water vapor which will heat the food pan. The amount of heat that is appropriate to maintain food at a desired temperature is a function of both the consistency of the food and the temperature of the food appropriate for its service. Where a dinner is being served, for example, the food should be quite hot so that the food will still be hot when the person served reaches his seat and begins to eat it. On the other hand hors d'oeuvres at a reception, though desirably warm, should not be so hot as to inhibit prompt and enjoyable consumption.

With canned fuels, the fuel is either an alcohol base material or an oil and wick arrangement. The alcohol materials tend to vapor lock so that flame size varies and produces uneven heat. Diaphragms are sometimes provided that are adjustable to control the size of the flame and with it hopefully the amount of heat produced. The problem with these diaphragms is that with the tendency of the alcohol type fuel to vaporize, the flame is often extinguished.

With wick and oil heat sources, the only ability to control the temperature of the flame is by spreading of the wick to increase the size of the flame. Thus, at best there is very limited control of temperature using a flame arrangement.

Canned heat sources are costly and wasteful. Typically after a food service the cans which have been used will be disposed of and new cans will be used at a subsequent service to be sure that there is adequate fuel at the subsequent service. Moreover, cans of fuel typically must be bought in quantity which ties up both capital and storage space.

The known electrically heated chafing dishes also have drawbacks. Thermostatic controls are provided which are expensive, of variable degrees of reliability, and relatively short lived. Temperature control with thermostatically controlled heating elements is little better than what is achieved with a flame.

Some prior electric heater elements project through holes in the water pan to provide terminals for connection to a power source. These holes obviously must be sealed and are themselves a source of service trouble.

Heater elements which are physically connected to the water pan with portions of the elements projecting through holes in the water pan, are difficult to clean. Since they are difficult to clean the elements tend to suffer from scale build up which reduces efficiency and degrades the performance of the unit.

Other prior proposals placed electric heating elements beneath the water pan. These proposals required support structure adding significantly to complexity and cost.

SUMMARY OF THE INVENTION

A chafing dish made in accordance with this invention is a clean and odorless dish which utilizes a lift out immersion heating element. The element includes a shaped heat dispensing loop designed to rest on the bottom of a chafing dish water pan. The element has upstanding arms each including a cold zone extending upwardly from approximately the top level of water in the water pan when the chafing dish is in use. These upstanding arms project through complemental notches in a food pan supported by the water pan and a lid. Alternatively, the arms extend through notches in upper portions of the water pan.

One of the outstanding features of the invention is the recognition that if one provides an appropriate volume of water for a given desired heat condition, that heat condition can be achieved with a constantly operated electrical heat source. Expressed another way, providing a predetermined and appropriate volume of water to the water pan, results in the water itself functioning as the thermostat and food to be served being maintained at an appropriate temperature.

To assist in the provision of an appropriate volume of water for a desired heat condition, indicia are provided on a side wall of the water pan. In operation one determines the desired food temperature to be maintained and the amount of water vapor required to achieve that temperature. Water is placed in the water pan to the level of an appropriate indicia which functions as a graduation to indicate the level to which water should be added to provide a volume of water appropriate to produce the desired hot vapor. Alternatively one measures out an appropriate volume of water and then pours it into the water pan.

The preferred immersion elements come in two forms. One for end connection to a source of electric power and the other for side connection. The choice of side or end connection is so that the connection is remote from the person being served whether the chafing dish is oriented with its major dish dimension parallel to or perpendicular to the path of travel of persons being served.

The immersion heater itself rests on the bottom of a water pan and surrounds areas of the pan where heat will be applied if flame heat is used. Thus, if a user of the dish desires to use flame heat for aesthetics or through error, heat from the flame will not adversely effect the immersion element.

The immersion element is highly efficient. A 110 watt, 500 volt element produces outstanding results in a standard sized chafing dish for a cost of about 5¢ per hour as contrasted with about $1.00 per hour when canned fuels are the heat source.

Another advantage of the immersion heater is that with its upper cold zone it is always cool to the touch for lift out. Thus, when a serving has been completed one may simply grasp the cold zone of the immersion heater and lift it out. Moreover since the immersion heater is in water even its hottest portions will be quickly cooled to under 200° F. once power is cut off. By contrast burned fingers are a relatively common occurrence if one has to, for example, replace a consumed fuel can with a fresh fuel can during the course of a serving.

In one embodiment the food pan and lid are each notched to receive the upstanding arms of the heating element. Where a unit is to accept either a side or an end contact heater both the side and the ends of a food pan and the lid flanges are notched. If a side heater is used the side notches of the food pan and lid are aligned while the end notches are positioned at opposite ends so that a flange of the lid covers the end notches of the food pan and a flange of the food pan closes the end notches of the lid to avoid leakage. Conversely when the end notches are used the side notches are at opposite sides so that leakage of water vapor through the notches is avoided.

Since the immersion heaters that are employed are lift out, an owner of a chafing dish can quickly retrofit his chafing dish by simply providing food pans and lids which are notched on obtaining an immersion heater. Alternatively one may retrofit by providing a notched water pan which permits the owner to use standard and food pans and lids.

Accordingly, an object of the invention is to provide a novel and improved chafing dish and a method of using a chafing dish. Other objects and a fuller understanding of the invention may be had by referring to the following description and claims taken in conjunction with the accompanying drawings.

IN THE DRAWINGS

Figure 4C:
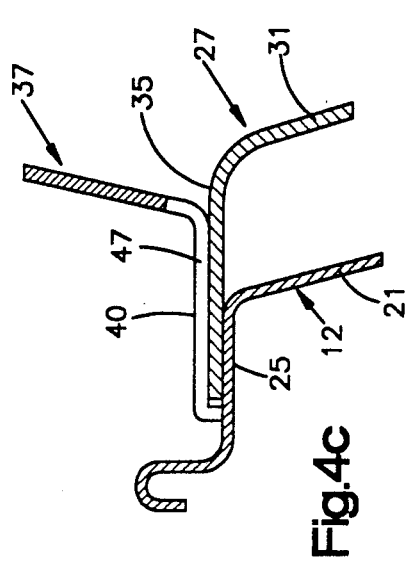
Figure 7:
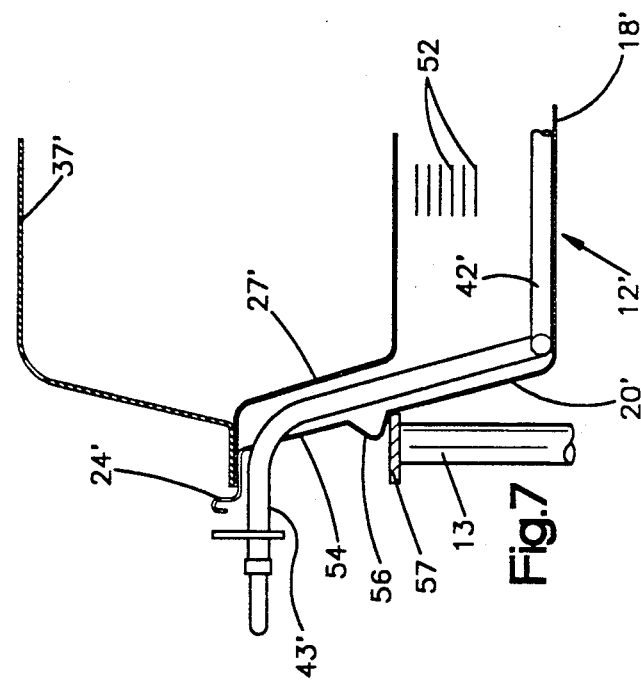
Figure 4A:
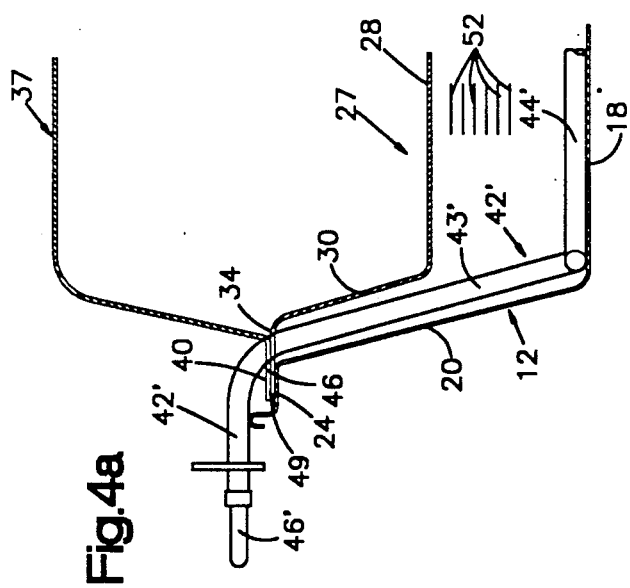
Figure 4B:
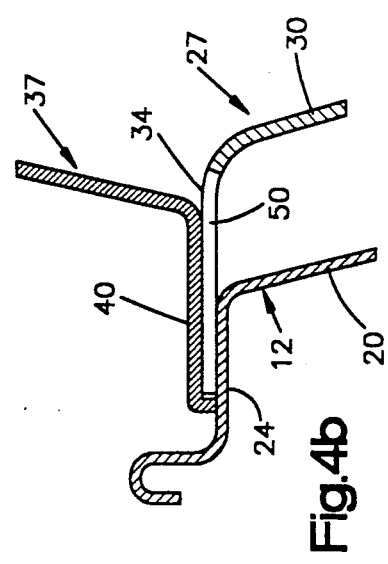

FIGS. 4A-4C are en fragmentary sectional views from the planes indicated by the lines 4a and 4c of FIG. 5 and 4b of FIG. 6;

FIGS. 5 and 6 are top plan views showing the water pan and the heater element in dotted line and the food pan and lid in place with an end contact heating element in FIG. 5 and a side contact heating element in FIG. 6; and FIG. 7 is an enlarged fragmentary sectional view of a chafing dish equipped with a notched water pan.

DESCRIPTION OF THE PREFERRED EMBODIMENT

Figure 1:
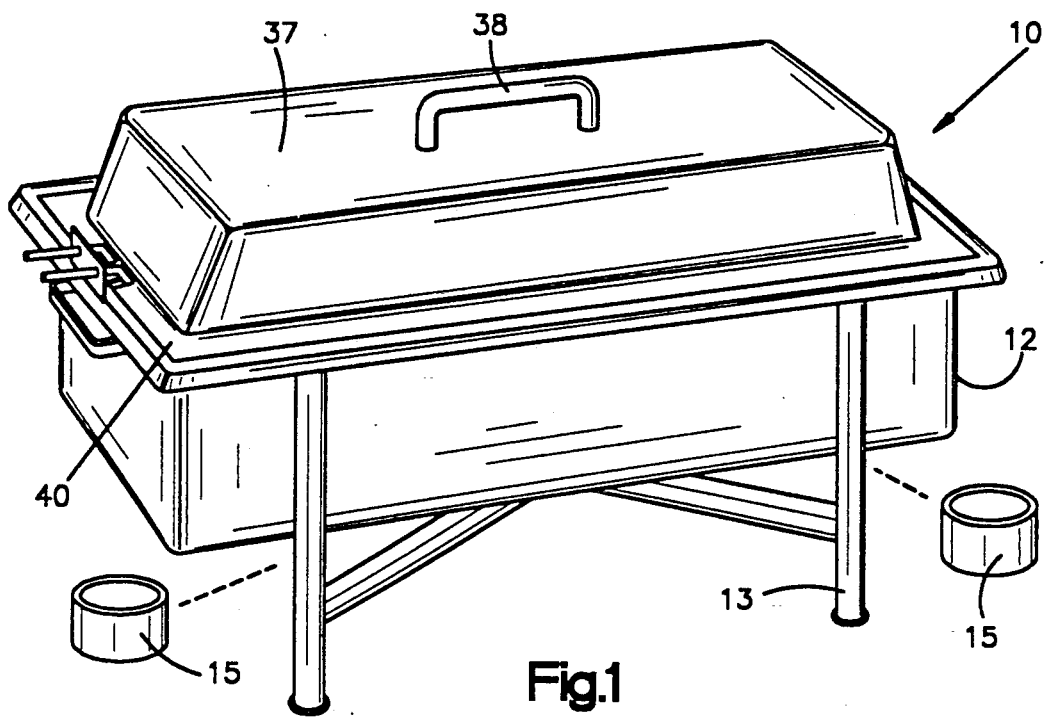
FIG. 1 is a perspective view of the chafing dish of this invention.

Referring to the drawings and to FIG. 1 in particular a chafing dish is shown generally at 10. The dish includes a water pan 12. The water pan 12 is supported by a leg and bracing structure 13 in spaced relationship with a table or other support surface, not shown.

Flammable fuel cans 15 are shown in FIG. 1. As indicated by the dashed lines of FIG. 1 these cans are positionable in conventional receptacles as indicated by the dotted line 16 of FIGS. 2 and 3. The dotted line 16 also represents an upward extension of an imaginary geometric configuration generated by the receptacle.

The water pan 12 includes an imperforate base 18 and upstanding imperforate end and side walls 20, 21. The water pan also has generally horizontally disposed end and side flanges 24, 25 for supporting a food pan 27. The food pan includes a bottom 28 and upstanding end and side wall 30, 31. A generally horizontally disposed perimeteral flange surrounds the end and side walls 30, 31. The flange includes side and end portions 34, 35. The food pan end and flange portions 34, 35 are complemental with the end and side flanges 24, 25 of the water pan so that the food pan rests on the water pan flanges in a relationship that provides a substantial seal for water vapor generated in the water pan.

The water and food pans respectively define a water retaining volume and a food retaining space. When in use, water is in the water pan to a level below the food pan while food to be warmed and served is in the food pan.

A lid 37 is provided. The lid 37 is conventionally provided with a handle 38. The lid 37 has a perimeteral flange 40 which rests on the food pan flange in heat retention relationship.

Figures 2, 3:
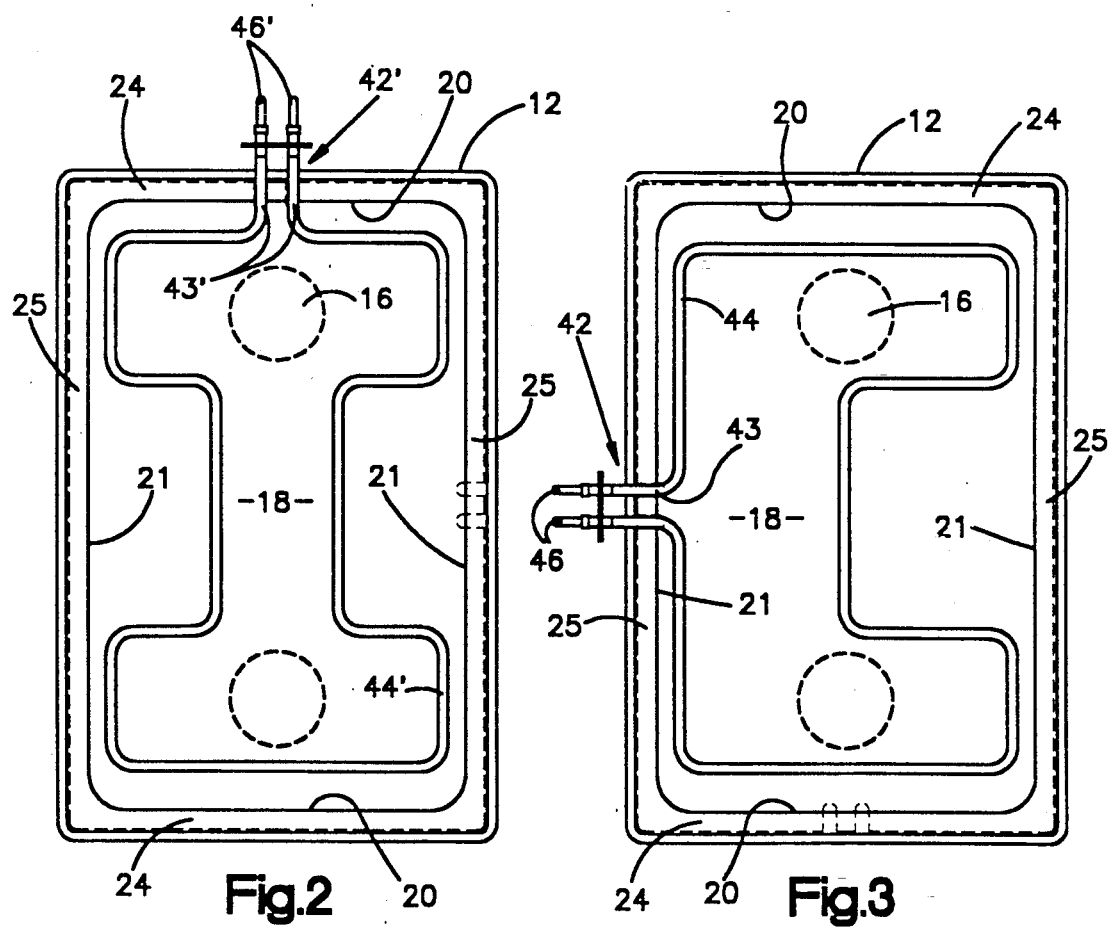
FIGS. 2 and 3 are top plan views of the water pan in this invention respectively equipped with an end contact and a si immersion heater.

A side contact heating element 42 is shown in FIG. 3. The heating element 42 includes upstanding arms 43 that include cold zones from approximately the water level upward. The heating element 42 also includes an immersion loop 44 sized and configured to rest on the water pan base 18 to surround and be spaced from the certain parts of the base 18 which are above the heat can receptacle 16. Thus, if flame is used in conjunction with the immersion element the flame heat will be spaced from the immersion element. The element 42 also includes electrical contacts 46 which are conventional contacts adapted to receive a 110 volt AC standard electrical female connector.

In FIGS. 2 and 4A, an end contact immersion element 42' is shown. Apart from the location of the contacts and a slightly different configuration of the immersed loop, the end and side contact immersion heaters are the same. The immersion heater 42' includes elements 43', 44', and 44' as to which the description of the elements 43, 44, and 44 is appropriate and not repeated.

A side and an end portion of the lid flange 40 are respectively equipped with pairs of notches 46, 47 which are best seen in FIGS. 5 and 6. One of the end flange portions 34 of the food pan 27 is equipped with a pair of notches 49. One of the side flange portions 35 is equipped with a pair of notches 50. When a side contact heating element 42 is used the notches 47, 50 are aligned to receive the upstanding arms 43. When an end contact element 42' is used the notches 46, 49 are aligned to receive the upstanding arms 43'.

Indicia in the form of graduations 52, FIG. 4A, are provided. The indicia are provided so that one will know when the water pan is filled to a given graduation what volume of water is contained in the pan.

Referring now to FIG. 7, an alternate embodiment which is preferred for retrofit of existing chafing dishes is shown. In FIG. 7 like numerals have been used with primes added. Thus, the food pan and lid are shown as 27' and 37' because they're conventional, unnotched components of the system.

In the embodiment in FIG. 7, the wall 20' of the water pan 12' includes notches 54. These notches extend through the water pan flange 24' downwardly a sufficient distance to receive the upstanding arm 43' of the end contact element 42' allowing the element to rest on the water pan base 18'.

In order to allow room for the upstanding arms 43' to project outwardly through the notches 54, the water pan is maintained in an elevated condition relative to leg and bracing structure as contrasted with the lower position of the embodiments of pages 1 to 6. To accomplish this, each end wall 20' includes at least one outwardly extending projection 56 which rests on a top 57 of the leg and bracing structure 13. The projection 56 may be an elongate projection, transversely speaking, in the side wall, or a plurality of spaced smaller projections. Each end wall is equipped with such projections. Alternatively or in addition to the end wall projections, comparable projections are provided in the side walls 20' not shown. But one projection is shown in that any cross-sectional view of the projections, be they side or end wall projections, would be the same.

Operation

In operation one first selects the appropriate side or end contact immersion heating element 42 or 42'. The selected element is placed in the water pan with its shaped heat dispensing loop in contact with the water pan base 18.

Next an operator determines a substantially optimum temperature for a food to be served. Having determined the temperature the operator next determines the volume of water required to provide water vapor of a volume and temperature appropriate to achieve the optimum food temperature. The appropriate volume of water is then placed in the water pan. Preferably this is done by simply pouring water into the pan until the top of the volume of water in the pan is aligned with the appropriate one of the graduations 52. The immersion heater is coupled to a standard 100 volt AC source adequate to supply 500 watts, i.e., approximately 5 amps.

Food to be served is then placed in the food pan and the food pan is placed on the water pan with the water pan's side and end flanges 24, 25 functioning as complementally configured co-acting food pan support surfaces. When using the embodiment of FIGS. 1-6, as the food pan is placed in the water pan, the appropriate side or end notches 49, 50 are aligned with the upstanding arms 43' or 43 respectively. If a lid is to used it is then manipulated so the appropriate pair of end or side notches 46, 47 is aligned with the upstanding arms 43' or 43.

Ideally the water added is either preheated or the heating element is operated for a time to heat the water before a food pan containing food is mounted on the unit. In any event throughout the service the heating element is constantly energized to provide water vapor from the water volume in the water pan. The appropriate volume of water having been selected, the water will function as a thermostat and water vapor of appropriate temperature and volume will be generated to maintain the food at its preselected substantially optimum temperature.

Tests have been conducted using a Calrod brand heater element corresponding to the element 42 of FIG. 3. The tested element included an immersion loop 44 about 10 by 18 inches in overall dimension positioned in a 14×22 inch water pan, a popular size. One gallon of water at 135° F. was placed in the water pan and the food pan was substantially filled with water also at 135° F. After 45 minutes the water in the water pan measured 180° F. while the food pan water measured 160° F. Thereafter the temperatures stabilized at approximately 190° F. and 160° F. respectively. Ambient temperature was 70° at the start, was at 72° when recorded 2 hours and 15 minutes after the start and dropped to 68° F. after 4 hours when the test was terminated. The test was terminated because it was conducted on a screened in porch which was then being subjected to a strong wind. Final temperature measurements of the water in the pans were 185° F. and 157° F. respectively.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim:

1. A chafing dish comprising:
   (a) a water pan including a base and side walls defining a water retaining space;
   (b) a flanged food pan including side walls and an imperforate bottom defining a food retaining space;
   (c) the food pan flanges and upper surfaces of the water pan side walls being complementally configured to provide coacting food pan support surfaces for supporting the food pan bottom above the water pan base and above the intended level of water in the water pan when the dish is in use;
   (d) an immersion heater having a heat generating capacity appropriate to maintain any quantity of water in the water pan which quantity is within the operating range of the dish at an elevated temperature below the boiling point while the dish is in use, said heat generating capacity being insufficient to cause the water to reach its boiling point during normal operation of the dish the heater being adapted for direct connection to a power source without intervening electrical controls;
   (e) the heating element being a lift out element including an immersible water heating portion sized and configured to rest on the water pan base the element including an upstanding arm for projecting upwardly above the intended level of water in the water pan and outwardly for connection to a power source, the heater including the arms having continuous imperforate walls extending upwardly above the intended water level; and,
   (f) one of the pans complemental surfaces being notched to receive said up standing arms.

2. The chafing dish of claim 1 wherein the element is constantly energized when in use to provide a consistent heat source.

3. The dish of claim 1 wherein a set of legs are connected to the water pan for supporting the dish when in use.

4. The dish of claim 3 wherein a receptacle is provided for receiving canned flammable fuel and the element is configured such as to be around a vertical upward extension of an imaginary geometric configuration generated by the receptacle whereby heat from a flame supplied by such cammed fuel will impinge on the water pan base at locations spaced from parts of the base contacting the element.

5. The dish of claim 1 wherein one of the water pan side walls is calibrated to indicate optimum water depth according to the food to be warmed.

6. The dish of claim 1 wherein said one pan is the food pan.

7. The dish of claim 6 wherein an end flange of the food pan is notched.

8. The dish of claim 6 wherein a side flange of the food pan is notched.

9. The dish of claim 1 wherein said one pan is the water pan.

10. A chafing dish comprising:
(a) a water pan having an imperforate base and upstanding, interconnected, imperforate side and end walls, the base and walls together defining a water retaining volume;
(b) leg and bracing structure secured to the water pan and adapted to support the pan above a support surface;
(c) a canned heat support carried by the structure and adapted to support a can of flammable fuel below a certain part of the base;
(d) a heating element including a shaped heat dispersing loop adapted to rest on the base and configured not to be over said certain part of the base when in use;
(e) a food pan including a bottom and flanged side and end walls with the flanges of the food pan walls being complemental with parts of the water pan walls to support the food pan on the water pan with the bottom above and spaced from the base and the element and the intended level of water in the water pan;
(f) the element including upstanding arms for projection out of said volume;
(g) one of the food pan flanges being notched to receive the arms to provide the element access to an external source of power for direct connection of the element to the source for continuous heating of the element when in use; and,
(h) the element having a heat generating capacity appropriate to maintain any quantity of water in the water pan which quantity is within the operating range of the dish at an elevated temperature below the boiling point while the dish is in use, said heat generating capacity being insufficient to cause the water to reach its boiling point during normal operation of the dish.

11. The dish of claim 10 wherein the notched flange is a side flange.

12. The dish of claim 11 wherein a food pan cover is provided, the cover being adapted to fit on and close the food pan and wherein the cover is notched complemental to the notched flange.

13. The dish of claim 10 wherein the notched flange is an end flange.

14. The dish of claim 13 wherein a food pan cover is provided, the cover being adapted to fit on and close the food pan and wherein the cover is notched complemental to the notched flange.

15. The dish of claim 10 where in both a side and an end flange are notched.

16. The dish of claim 15 wherein a food pan cover is provided, the cover being adapted to fit on and close the food pan and wherein the cover is notched complemental to the notched flanges.

17. The dish of claim 10 wherein a water pan wall includes indicia providing calibrations to apprise the user of the depth of water to be provided in said volume to provide the volume of water appropriate for maintaining the food to be served at an appropriate temperature.

18. A process of operating a chafing dish to maintain food at an appropriate temperature for serving:
(a) determining a substantially optimum food temperature for a given food to be served;
(b) determining the volume of water appropriate to provide water vapor of a volume and temperature which will maintain said substantially optimum food temperature without use of thermostatic switching;
(c) placing such determined volume of water in a water pan equipped with an immersion electrical heating element;
(d) placing a quantity of such given food in a food pan; and
(e) mounting the food pan on the water pan with the food pan in spaced relationship with such determined volume of water; and
(f) energizing said element on a substantially continuous basis as such food is served.

19. The process of claim 18 wherein the appropriate volume of water is determined by selecting one of a series of water pan calibrations appropriate to indicate a water level to provide a proper volume of water.

20. A chafing dish comprising:
(a) a water pan having an imperforate base and upstanding, interconnected, side and end walls, the base and walls together defining a water retaining volume;
(b) leg and bracing structure secured to the water pan and adapted to support the pan above a support surface;
(c) a food pan including a bottom and flanged side and end walls with the flanges of the food pan walls being complemental with parts of the water pan walls to support the food pan on the water pan with the bottom above and spaced from the base and the element and the intended level of water in the water pan
(d) the element including upstanding arms for projection out of said volume;
(e) one of the water pan walls being notched to receive the arms to provide the element access to an external source of power for direct connection of the element to the source for continuous heating of the element when in use; and,
(f) the element having a heat generating capacity appropriate to maintain any quantity of water in the water pan which quantity is within the operating range of the dish at an elevated temperature below the boiling point while the dish is in use, said heat generating capacity being insufficient to cause the water to reach its boiling point during normal operation of the dish.

21. The dish of claim 20 wherein a water pan wall includes indicia providing calibrations to apprise the user of the depth of water to be provided in said volume to provide the volume of water appropriate for maintaining the food to be served at an appropriate temperature.

22. The dish of claim 20 wherein selected ones of the water pan side and end walls include portions projecting outwardly to support the water pan on the leg and bracing structure with the notches above the projections.

* * * * *